US010503942B1

(12) United States Patent
Thurston et al.

(10) Patent No.: US 10,503,942 B1
(45) Date of Patent: Dec. 10, 2019

(54) SYSTEMS AND METHODS FOR A DATA CENTER MONITORING SYSTEM

(71) Applicant: FMR LLC, Boston, MA (US)

(72) Inventors: Bob Thurston, Boston, MA (US); Michael Bailey, Boston, MA (US); David Wyman, Boston, MA (US); Stephen Singer, Boston, MA (US); Marc Slater, Boston, MA (US); Iosif Grigoryev, Boston, MA (US); Cesar Arriaga, Boston, MA (US); Luis Diaz, Boston, MA (US); Nathan Barnfield, Boston, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/502,406

(22) Filed: Jul. 3, 2019

(51) Int. Cl.
*G06F 19/00* (2018.01)
*G06K 7/10* (2006.01)
*G06F 11/30* (2006.01)

(52) U.S. Cl.
CPC ...... *G06K 7/10366* (2013.01); *G06F 11/3006* (2013.01); *G06F 11/3058* (2013.01)

(58) Field of Classification Search
USPC ........................................................ 235/385
See application file for complete search history.

(56) References Cited

U.S. PATENT DOCUMENTS

| 8,171,142 | B2 | 5/2012 | Kolin et al. |
| 8,482,429 | B2 | 7/2013 | Aguren |
| 8,674,822 | B2 | 3/2014 | Priyantha et al. |
| 9,864,417 | B2 | 1/2018 | Bermudez Rodriguez et al. |
| 2016/0055447 | A1* | 2/2016 | Sehmer ............... G06Q 10/087 235/385 |
| 2017/0126505 | A1 | 5/2017 | Cencini et al. |

* cited by examiner

*Primary Examiner* — Jamara A Franklin
(74) *Attorney, Agent, or Firm* — Proskauer Rose LLP (57) ABSTRACT

A system is provided for monitoring a data center that includes at least one rack cabinet configured to store at least one computing asset. The system includes a radio-frequency identification (RFID) tag attached to the computing asset, where the RFID tag stores inventory data related to the computing asset. The system also includes a plurality of tracking modules disposed inside of the rack cabinet without being physically attached to the computing asset. Each tracking module is adapted to monitor a condition inside of the rack cabinet. At least one of the plurality of tracking modules includes an RFID reader configured to communicate with the RFID tag to obtain the inventory data of the computing asset. The RFID tag and reader maintain a line of sight relative to each other inside of the rack cabinet to minimize metallic interference during communication therebetween.

20 Claims, 4 Drawing Sheets

Attach a radio-frequency identification (RFID) tag to the computing asset
602

Dispose a plurality of tracking modules inside of the rack cabinet without being physically attached to the computing asset
604

Maintain a line of sight between the RFID tag and the RFID reader inside of the rack cabinet while the RFID reader communicates with the RFID tag
606

Communicate, by a controller module coupled to the rack cabinet, with each of the plurality of environmental tracking modules to automatically collect condition information and inventory data
608

Publish, by the controller module, the condition information and the inventory data to a messaging bus to which at least one user subscribes
610

FIG. 6

SYSTEMS AND METHODS FOR A DATA CENTER MONITORING SYSTEM

TECHNICAL FIELD

This application relates to methods and apparatuses for monitoring a data center that includes one or more rack cabinets used to store one or more computing assets, such as servers and other computer equipment.

BACKGROUND

A business organization may house some or all of its computing assets, such as data storage devices, servers, network devices and other information technology (IT) equipment, at a physical facility, referred to as a data center, in order to manage these computing assets efficiently. The hardware devices in a data center can be housed in metallic cabinets, referred to as racks.

With the recent proliferation of smaller and more powerful computing devices, a greater amount of energy is required to power these devices while more heat is generated by them. Thus, environmental metrics, including temperatures and power requirements, can vary significantly across a large data center facility or between different data centers. Another factor that is of concern to data center operators is asset management. It is difficult to keep track of many individual pieces of equipment, as equipment can be added and removed frequently or simply moved from one location to another within the same center or between centers.

SUMMARY

The present invention features a data center management system configured to automatically track assets and environmental data (e.g., temperature, humidity and power consumption) across one or more data centers. Such tracking and validation can be performed in real time or near real time from each rack location. In some embodiments, the management system of the present invention is integrated with an alert system that can trigger an alert and provide centralized notifications based on, for example, a percentage of change in the monitored data over time. In some embodiments, the tracking is accomplished by a suite of sensors, one or more RFID tags and other off-the-shelf components (e.g., micro-servers programmed from Raspberry Pi devices) that are designed for ease of installation and maintenance.

In one aspect, the present invention features a system for monitoring a data center that includes at least one rack cabinet configured to store at least one computing asset. The system includes a radio-frequency identification (RFID) tag attached to the computing asset, where the RFID tag stores inventory data related to the computing asset. The system also includes a plurality of tracking modules disposed inside of the rack cabinet without being physically attached to the computing asset. Each tracking module is adapted to monitor a condition inside of the rack cabinet. At least one of the plurality of tracking modules includes an RFID reader configured to communicate with the RFID tag to obtain the inventory data of the computing asset. The RFID tag and reader maintain a line of sight relative to each other inside of the rack cabinet to minimize metallic interference during communication therebetween. The system further includes a controller module coupled to the rack cabinet and in electrical communication with the plurality of environmental tracking modules. The controller module is configured to automatically collect condition information and inventory data from the plurality of tracking modules, self-identify its location, and publish the condition information, inventory data and location data to a messaging bus to which at least one subscriber subscribes.

In another aspect, the present invention features a method for monitoring a data center that includes at least one rack cabinet configured to store at least one computing asset. The method includes attaching a radio-frequency identification (RFID) tag to the computing asset, where the RFID tag stores inventory data related to the computing asset. The method also includes disposing a plurality of tracking modules inside of the rack cabinet without being physically attached to the computing asset. Each tracking module is adapted to monitor a condition inside of the rack cabinet. At least one of the plurality of tracking modules includes an RFID reader. The method additionally includes maintaining a line of sight between the RFID tag and the RFID reader inside of the rack cabinet while the RFID reader communicates with the RFID tag to obtain the inventory data associated with the computing asset. The method further includes communicating, by a controller module coupled to the rack cabinet, with each of the plurality of environmental tracking modules to automatically collect condition information and inventory data from the plurality of tracking modules, and publishing, by the controller module, the condition information and the inventory data to a messaging bus to which at least one user subscribes.

Other aspects and advantages of the invention will become apparent from the following detailed description, taken in conjunction with the accompanying drawings, illustrating the principles of the invention by way of example only. In some embodiments, the plurality of tracking modules includes at least four environmental tracking modules configured to track one or more environmental conditions inside of the rack cabinet. In some embodiments, each of the plurality of environmental tracking modules comprises one or more of a temperature sensor, a humidity sensor, a pressure sensor, a particulate sensor and a vibration sensor. At least two of the environmental tracking modules can be mounted on a back area of the rack cabinet with at least one environmental tracking module on a top portion of the rack cabinet and at least another environmental tracking module on a bottom portion of the rack cabinet. At least two of the environmental tracking modules can be mounted on a front area of the rack cabinet with at least one environmental tracking module on the top portion and at least another environmental tracking module on the bottom portion.

In some embodiments, the subscriber is a remote server configured to analyze and display the condition information, the inventory data, and the location data published by the controller module. In some embodiments, the remote server is adapted to determine and display at least one of: (i) temperatures determined by the temperature sensors of the environmental tracking modules, (ii) a first temperature gradient between the front area and the back area of the rack cabinet, and (iii) a second temperature gradient between the top portion and the bottom portion of the rack cabinet.

In some embodiments, the remote server is adapted to issue an alert if at least one of the temperatures, the first temperature gradient, or the second temperature gradient is above or below a predefined threshold. In some embodiments, the remote server is adapted to issue an alert if a humidity level inside of the rack cabinet is above or below a predetermined threshold based on measurements by the humidity sensor. In some embodiments, the remote server is adapted to issue an alert if air flow contamination is detected based on measurements by the particulate sensor. In some embodiments, the remote server is adapted to detect malfunctioning by the computing asset based on excess vibration detected by the vibration sensor.

In some embodiments, the plurality of tracking modules comprises at least two door tracking modules that are mounted on respective ones of a front door and a back door of the rack cabinet to detect an intrusion of the rack cabinet. The remote server can issue an intrusion alert if an intrusion of the rack cabinet is detected based on measurements by the door tracking modules.

In some embodiments, the RFID tag comprises a passive tag. In some embodiments, the controller module maintains wired connection with the plurality of tracking modules.

In some embodiments, the remote server is configured to automatically obtain power consumption data from at least one power distribution unit (PDU) of the rack cabinet based on an IP address of the PDU and using a Simple Network Management Protocol (SNMP) communication protocol. In some embodiments, the remote server is adapted to detect a power imbalance in the rack cabinet based on the power consumption data. In some embodiments, the remote server visualizes data collected from the controller module and the PDU on an online dashboard that is configurable by a user.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
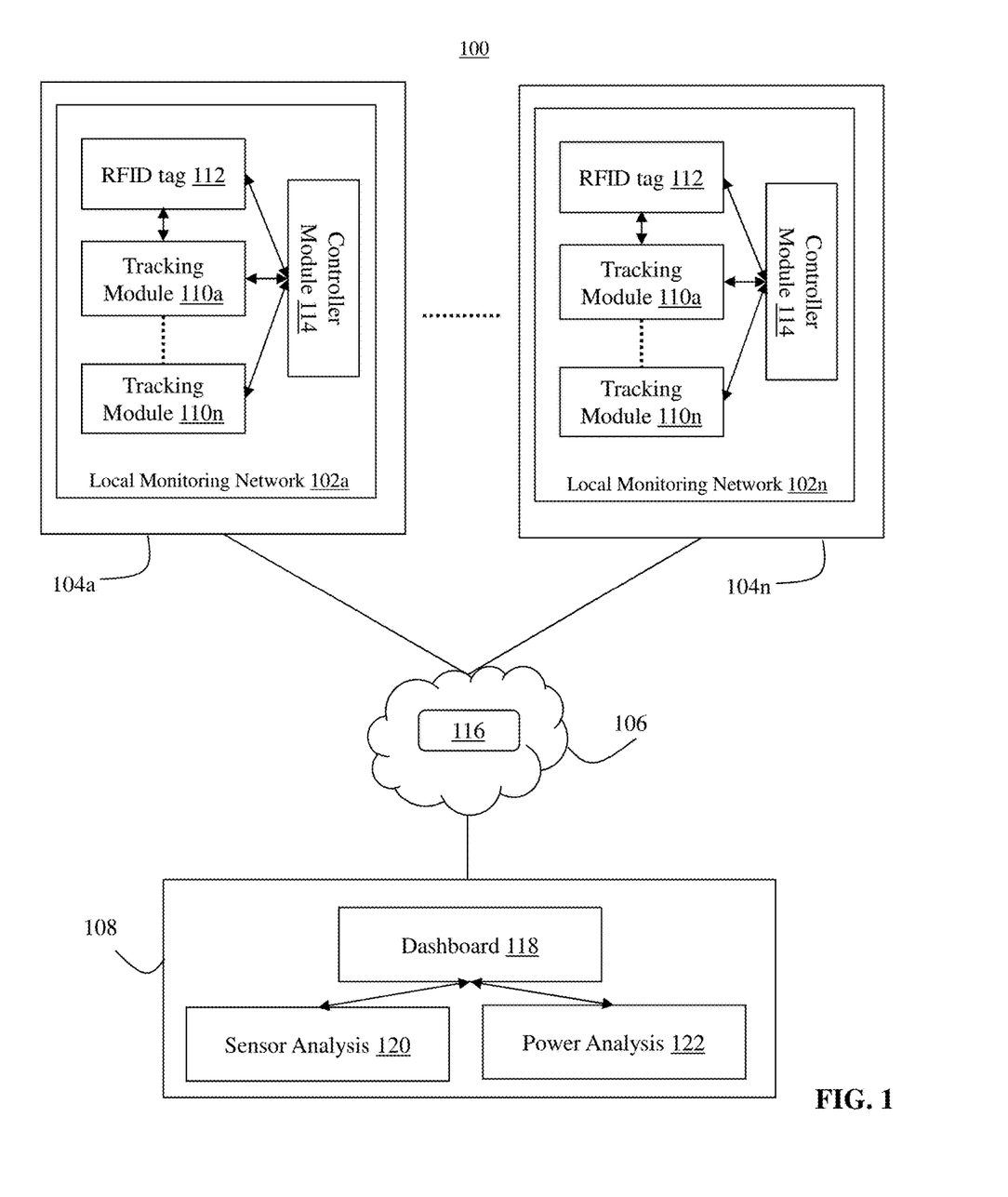
FIG. 1 shows an exemplary data center management system, according to some embodiments of the present invention.

FIG. 1 shows an exemplary data center management system 100, according to some embodiments of the present invention. The system 100 includes a local monitoring network 102 coupled to a rack cabinet 104 of a data center. In some embodiments, substantially the same local monitoring network 102 is attached to every rack cabinet 104 in the data center. Each local monitoring network 102 is adapted to communicate over a communication network 106 with a remote central server 108 that may or may not be located in the data center.

In particular, the local monitoring network 102 of a rack cabinet 104 includes at least one radio-frequency identification (RFID) tag 112 physically coupled to a hardware computing asset (e.g., a server) housed inside of the rack cabinet 104 to store inventory information related to that asset. In some embodiments, an RFID tag 112 is physically attached to every unique computing asset in the rack cabinet 104. The local monitoring network 102 can also include multiple tracking modules 110, each in the form of a printed circuit board (PCB), distributed at various locations in the rack cabinet 104 to monitor one or more environmental conditions inside of the rack cabinet 104 at the respective locations. In some embodiments, the tracking modules 110 are not physically coupled to any of the computing asset stored in the rack cabinet 104, but are attached to the frame of the rack cabinet 104. The local monitoring network 102 can further include at least one controller module 114 in electrical communication with the tracking modules 110 and/or the RFID tag(s) 112 for automatically collecting the environment condition information in the rack cabinet 104 and the inventory data related to the one or more assets stored in the rack cabinet 104. The controller module 114 can also self-identify its location. The controller module 114 is configured to publish the information it has collected, including the condition information of the corresponding rack cabinet 104, the inventory data of the assets in the rack cabinet 104, and its location data, to a messaging bus 116 of the communication network 106 to which at least one subscriber subscribes. The various components of the local monitoring network 102 will be described below in further detail.

The communication network 106 is typically a wide area network, such as the Internet and/or a cellular network. In some embodiments, the communication network 106 is comprised of several discrete networks and/or sub-networks (e.g., cellular to Internet). The communication network 106 includes the messaging bus 116 that implements a shared set of interfaces through which the local monitoring networks 102 can communicate data to the remote server 108. For example, the local monitoring networks 102 can published data to the messaging bus 116 to which the remote server 108 is a subscriber.

The remote server 108 is a device including specialized hardware and/or software modules that execute on a processor to receive data from the multiple local monitoring networks 102 distributed throughout various data centers and perform functions relating to data center monitoring and tracking as described herein. In some embodiments, the remote server 108 is a cloud-based server. As shown, the remote server 108 includes a dashboard module 118, a sensor analysis module 120 and a power analysis module 122 that execute on the processor of the remote server 108. In operation, the remote server 108 can subscribe to the messaging bus 116 of the communication network 106 to obtain the information published by the controller modules 114 of the local monitoring networks 102 distributed among the rack cabinets 104 of one or more data centers. The sensor analysis module 120 can be configured to analyze the information collected from the local monitoring networks 102. The power analysis module 122 can be configured to directly interact with the power distribution units (not shown) of the data centers to collect and analyze power consumption data. The dashboard module 118 can display the data and analytics from the sensor analysis module 120 and the power analysis module 122 to enable remote and/or centralized monitoring of the computing assets and conditions in the rack cabinet 104. Other functions of the dashboard module 118 include issue alerts if an abnormality in the monitored data is detected and generate reports based on the collected historical data. In some embodiments, the data collected by the remote server 108 is stored in a time-series database (not shown), where data retention can be set to as long as the business requires.

In some embodiments, the modules 118, 120, 122 are specialized sets of computer software instructions programmed onto one or more dedicated processors in the remote server 108 and can include specifically designated memory locations and/or registers for executing the specific computer software instructions. Although the modules 118, 120, 122 are shown in FIG. 1 as executing within the same computing device 108, in some embodiments the functionality of the modules 108, 110, 112 is distributed among a plurality of computing devices. As shown in FIG. 1, the computing device 108 enables the modules 118, 120, 122 to communicate with each other to exchange data for performing the described functions. It should be appreciated that any number of computing devices, arranged in a variety of architectures, resources, and configurations (e.g., cluster computing, virtual computing, cloud computing) can be used without departing from the scope of the invention. The functionality of each of the modules 118, 120, 122 is described in detail below.

Figure 2:
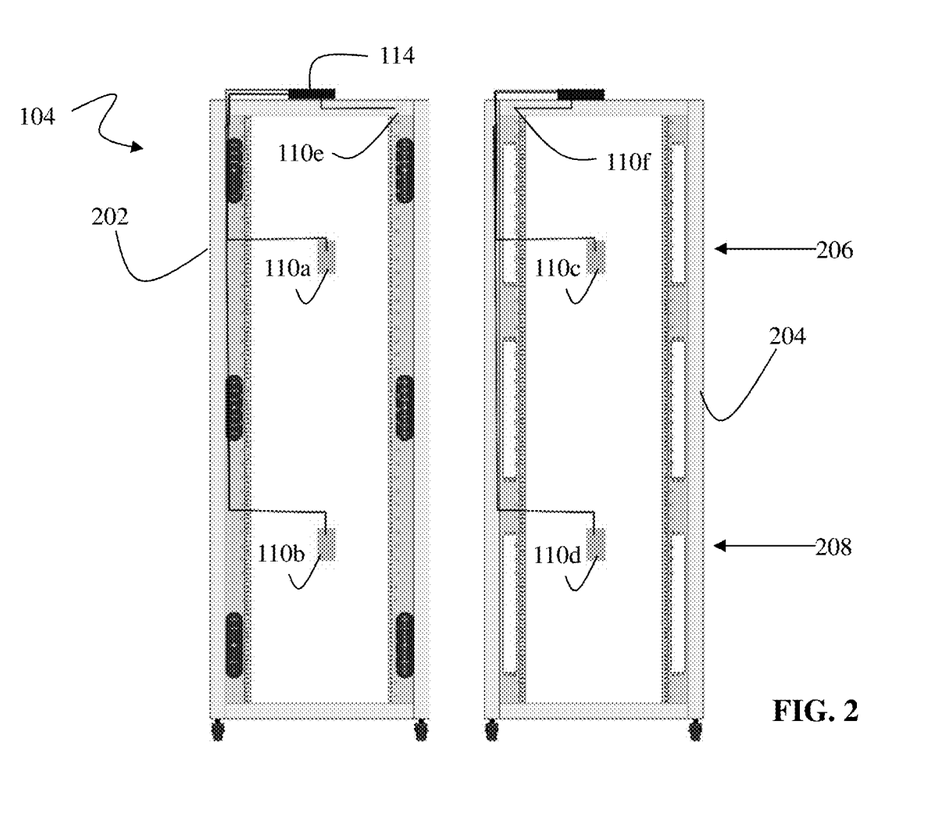
FIG. 2 shows an exemplary allocation of various components of a local monitoring network of the data center management system of FIG. 1 in relation to a rack cabinet, according to some embodiments of the present invention.

FIG. 2 shows an exemplary allocation of various components of a local monitoring network 102 of the data center management system 100 of FIG. 1 in relation to a rack cabinet 104, according to some embodiments of the present invention. As shown, the multiple tracking modules 110 include (i) at least four environmental tracking modules 110a-d configured to track one or more environmental conditions inside of the rack cabinet 104 and (ii) at least two door tracking modules 110e and 110f configured to detect an intrusion of the rack cabinet 104. The local monitoring network 102 of the rack cabinet 104 also includes the controller module 114. In some embodiments, each computing asset (not shown) that is housed within the rack cabinet 104 has an RFID tag (not shown) attached on an external surface of the computing asset. Each RFID tag is configured to store inventory information related to the corresponding asset, such as a unique identification number associated with that asset. In general, each RFID tag can be an active or passive tag. In some embodiments, an RFID tag of the present invention is passive such that it has no internal power source and is instead powered by the electromagnetic energy transmitted by an RFID reader. Using passive RFID tags is advantageous because they reduce parts cost as well as enable easier maintenance of the data center management system 100 since no batteries need to be periodically replaced.

In some embodiments, at least two of the environmental tracking modules 110 are mounted on a back area inside of the rack cabinet 104 with at least one environmental tracking module on a top portion inside of the rack cabinet and at least one environmental tracking module on a bottom portion inside of the rack cabinet. Similarly, at least two of the environmental tracking modules 110 are mounted on a front area inside of the rack cabinet 104 with at least one environmental tracking module on the top portion and at least another environmental tracking module on the bottom portion. For example, as shown in FIG. 2, environmental tracking modules 110a and 110b are mounted on the front door 202 of the rack cabinet 104 facing the interior of the cabinet 104, one in a high position 206 and the other in a low position 208 in relation to the front door 202. In addition, two environmental tracking modules 110c and 110d are mounted on the back door 204 of the rack cabinet 104 facing the interior of the cabinet 104, one in the high position 206 and the other in the low position 208 in relation to the back door 204. In general, the environmental tracking modules 110 can be attached to the interior of the rack cabinet 104 at various locations, such as at the doors and/or chassis. In some embodiments, they are not attached to the computing assets housed in the rack cabinet 104. Only one or more RFID tags are attached to these assets. Thus, there are no wired connections between the computing assets and the data center management system 100, including the local monitoring network 102 installed in the rack cabinet 104.

Figure 3:
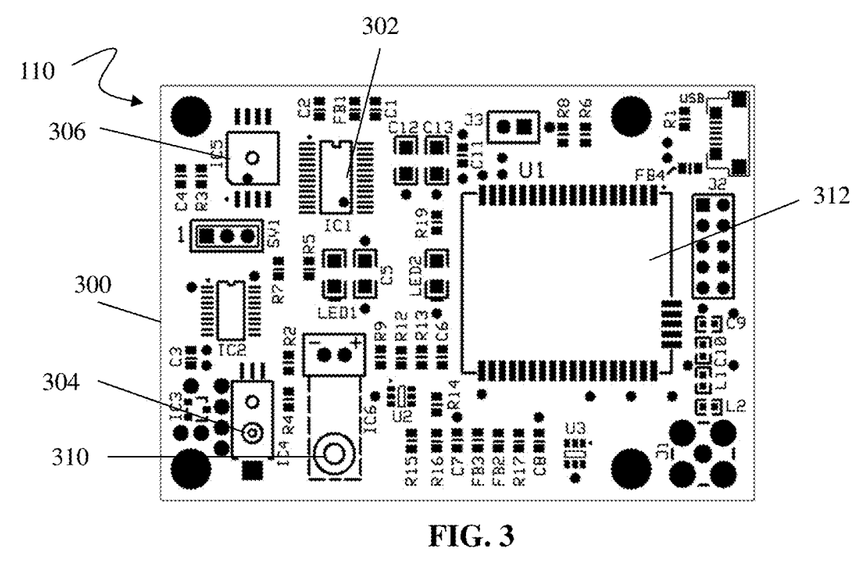
FIG. 3 shows an exemplary configuration of an environmental tracking module of FIG. 2, according to some embodiments of the present invention.

FIG. 3 shows an exemplary configuration of one of the environmental tracking modules 110a-d of FIG. 2, according to some embodiments of the present invention. As shown, each of the environmental tracking modules 110a-d is configured as a printed circuit board 300 having multiple sensors integrated on the same board 300, including one or more of a temperature sensor 302, a humidity sensor 304, a pressure sensor 306, a particulate sensor (not shown), and a vibration sensor 310. The temperature sensor 302 is adapted to measure a temperature at the location of the rack cabinet 104 where the board 300 is placed. The humidity sensor 304 is adapted to measure the humidity level in the ambient air near the location of the rack cabinet 104 where the board 300 is placed. The pressure sensor 306 is adapted to sense the pressure at the location of the rack cabinet 104 where the board 300 is placed. The particulate sensor is adapted to measure a concentration of particulates in the ambient air near the location of the rack cabinet 104 where the board 300 is placed. The vibration sensor 310 is adapted to measure a level of vibration at the location of the rack cabinet 104 where the board 300 is placed.

In some embodiments, at least one of the environmental tracking modules 110a-d also has an RFID reader 312 disposed on and integrated with its printed circuit board 300 for communicating with the one or more RFID tags coupled to the computing assets housed in the rack cabinet 104. Communication between the RFID reader 312 and the RFID tags that are assigned to various computing assets allows to the RFID reader 312 to obtain the inventory data stored on the RFID tags, such as the unique identification of the corresponding assets stored in the tags. In some embodiments, the remote server 108 can obtain the inventory data from the RFID reader 312, such as the identification number of each asset housed in the rack cabinet 104. The remote server 108, using the identification numbers, is adapted to retrieve from a database information related to the corresponding assets and use the information to monitor the physical locations of the assets in the data centers, such as the rack cabinets in which the assets are stored and whether assets have been moved to different rack cabinets in the same data center or at a different data center. As an example, the remote server 108 can track an asset from the receiving dock to final rack installation and everywhere in between. The remote server 108 can also use the information to compile an up-to-date inventory of all assets housed in each rack cabinet.

In addition to communicating with the RFID tags in the rack cabinet 104, the RFID reader 312 is also adapted to transmit electromagnetic energy to the RFID tags to power them if the tags are passive. Further, integrating the RFID reader 312 with the sensor board 300 enhances communication between an RFID tag and the RFID reader 312 by mitigating the Faraday shield that a rack cabinet 104 inherently produces due to its steel doors and sides. In particular, radio frequency signals generated by the RFID tags inside of the rack cabinet 104 cannot transmit through the metal doors and sides of the cabinet 104, thus cannot be read by an RFID reader located outside of the cabinet 104. Therefore, having the RFID reader 312 located on a tracking module and disposed inside of the rack cabinet 104 enables the RFID reader 312 to receive the radio frequency signals transmitted by the RFID tags without being blocked by the Faraday shield of the rack cabinet 104. The integration of the RFID reader 312 and the environmental sensors on the same board 300 also reduces the overall installation cost and complexity associated with RFID communication.

In some embodiments, a particular alignment of the RFID tags with the RFID reader 312 is not required, as long as each RFID tag maintains a line of sight (i.e., is visible) to the RFID reader 312 inside of the rack cabinet 104 to minimize metallic interference during communication. In some embodiments, mounting the environmental tracking modules 110a-d on the front and back doors 202, 204 enhances the line-of-sight communication path.

Further, mounting the environmental tracking modules 110a-d on the front and back interior areas (e.g., the front and back doors 202, 204 facing the interior of the rack cabinet 104) allows the remote server 108 to determine many environmental metrics associated with the rack cabinet 104. For example, using the temperature measurements provided by the temperature sensors 302 from the multiple environmental tracking modules 110a-d, the sensor analysis module 120 of the remote server 108 can determine a lateral temperature gradient between the front and back of the rack cabinet 104 and/or a vertical temperature gradient between the bottom and top of the rack cabinet 104. The dashboard module 118 of the remote server 108 can generate an alert if at least one of the following conditions is detected: the ingress temperature at the front interior area (e.g., at the front door 202) of the rack cabinet 104 or the egress temperature at the back interior area (e.g., the back door 204) is above or below a respective predefined temperature threshold, or the lateral or vertical temperature gradient is above or below a respective predefined temperature threshold. In some embodiments, the remote server 108 via the dashboard module 118 can recommend reallocation of the computing assets within the rack cabinet 104 or to other rack cabinets 104 to alleviate any detected temperature abnormalities, such as spiked temperatures to prevent potential power outages.

Similarly, using the humidity measurements provided by the humidity sensors 304 from the multiple environmental tracking modules 110a-d, the sensor analysis module 120 of the remote server 108 can determine if at least one of humidity measurements is above or below a predefined humidity threshold and interact with the dashboard module 118 to generate an alert accordingly. Using the measurements provided by the particulate sensors, the sensor analysis module 120 of the remote server 108 can detect airflow contamination inside of the rack cabinet 104 (i.e., if excessive dust or other particulates are sensed) and automatically implement or recommend remedial measures via the dashboard module 118, such as issuing an alert or shutting down power supply to the cabinet 104. Using the measurements provided by the vibration sensors 310, the sensor analysis module 120 of the remote server 108 can determine if a computing asset (e.g., a server fan or a hard disk drive) stored in rack cabinet 104 is malfunctioning due to excessive vibrations generated, and the dashboard module 118 can issue an alert accordingly. Using the temperature measurements provided by the temperature sensors 302 and power consumption data provided by one or more power distribution units (not shown), which are described in detail below, the sensor analysis module 120 can calculate the airflow (CFM) in different areas of a data center. Using the temperature measurements from the temperature sensors 302 and the humidity measurements from the humidity sensors 304, the sensor analysis module 120 can calculate dew points at various locations of a data center.

In some embodiments, the at least two door tracking modules 110e and 110f are configured to detect an intrusion of the rack cabinet 104. As shown, the door tracking modules 110e and 110f are mounted on respective ones of the front door 202 and the back door 204 of the rack cabinet 104, such as at the top of the doors. Each door tracking module 110e or 110f can be implemented on a small circuit board configured to measure the strength of a magnetic field or detect the presence of a magnetic field. Using the magnetic field measurements from the door tracking modules 110e and 110f, the sensor analysis module 120 of the remote server 108 can detect when a door is closed if, for example, a magnetic field is present or exceeds a first predefined threshold, or when a door is open if, for example, no magnetic field is present or the magnetic field exceeds a second predefined threshold. The dashboard module 118 of the remote server 108 can issue an intrusion alert if it detects that at least one of the front door 202 or the back door 204 of the rack cabinet 104 is open without authorization. In some embodiments, the dashboard module 118 correlates the intrusion alert with incident management to verify that any change management policies are being followed.

In some embodiments, the controller module 114 of the local monitoring network 102 associated with the rack cabinet 104 is configured to communicate with the environmental tracking modules 110a-d, at least one of which includes the integrated RFID reader 312, and the door tracking modules 110e, f. The controller module 114 is further configured to transmit the data obtained from each of these tracking modules 110a-f to the remote server 118 for tracking and analysis as described above. In some embodiments, each rack cabinet 104 has only one controller module 114, which can be coupled to a front door 202 or back door 204 of the cabinet 104.

Figure 4:
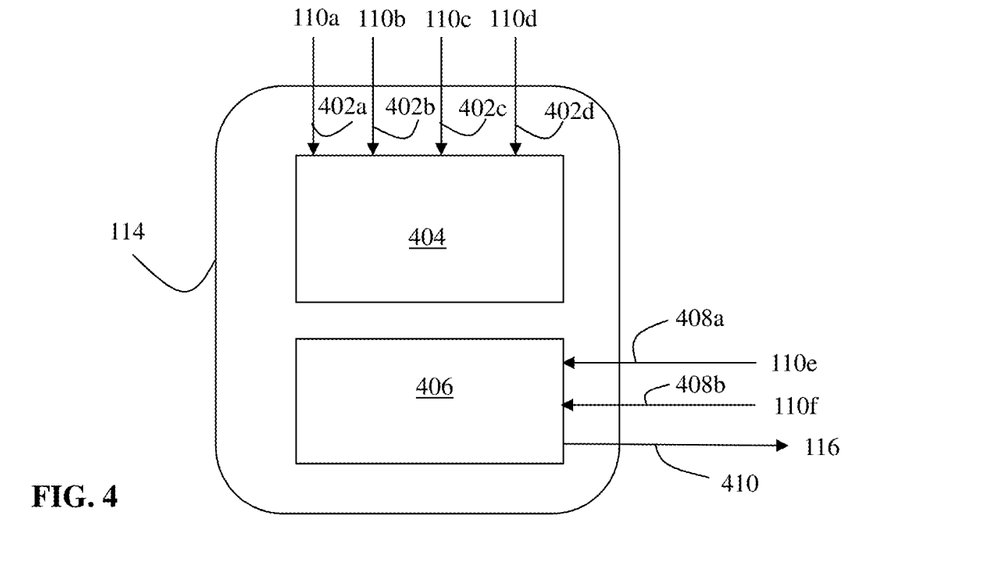
FIG. 4 shows an exemplary configuration of the controller module of FIG. 2, according to some embodiments of the present invention.

FIG. 4 shows an exemplary configuration of the controller module 114 of FIG. 2, according to some embodiments of the present invention. The controller module 114 can be a micro-server implemented using a commercial, off-the-shelf device such as a Raspberry Pi™ computer. As shown, the controller module 114 has at least four ports 402a-d (e.g., Universal Serial Bus (USB) ports) each configured to communicate with one of the environmental tracking modules 110a-d. Specifically, a sensor thread controller 404 of the controller module 114 is configured to receive and process the temperature, humidity, pressure, particulate and vibration level measurements from each of the environmental tracking modules 110a-d located at various positions within the rack cabinet 104 and forward the processed data to a main controller 406 of the controller module 114. The sensor thread controller 404 is also configured to determine the operability of the environmental tracking modules 110a-d by querying these modules 110a-d at regular intervals and signal the controller module 114 to stop operation if one of the modules 110a-d is unresponsive to the queries. In some embodiments, the sensor thread controller 404 is also configured to receive inventory data from the RFID reader 312 integrated with at least one of the environmental tracking modules 110a-d. Specifically, the RFID reader 312 transmits inventory data stored in the RFID tags that are attached to the computing assets in the rack cabinet 104. The sensor thread controller 404 processes the inventory data and forwards it to the main controller 406. The controller module 114 also has at least two ports 408*a, b* (e.g., GPIO, USB or other input/output ports) each configured to communicate with one of the door tracking modules 110*e* and 110*f*. The main controller 406 of the controller module 114 is adapted to receive magnetic field strength measurements from the door tracking modules 110*e, f* via the ports 408*a, b*.

In some embodiments, the ports 403 and 408 are one-way communication ports that only receive data from the tracking modules 110*a-f*, but do not transmit data to these modules. Thus, each local monitoring network 102 can be independent, i.e., does not receive any centralized instructions from the remote server 108. Hence, there is only one-way communication from each local monitoring network 102 to the remote server 108, which is configured to analyze and/or display the information collected from the local monitoring networks 102. In some embodiments, these communication ports are represented as wired connections (e.g., via cables) between the controller module 114 and the tracking modules 110*e-f*. The wired connections enable more secured data access and facilitate installation of the local monitoring network 102.

The controller module 114 also includes an output port 410 configured to communicate with the messaging bus 116 of the communication network 106 to which the remote server 108 subscribes, as illustrated in FIG. 1. Thus the messaging bus 116 serves as a communication interface between the local monitoring network 102 of each rack cabinet 104 and the remote server 108. The controller module 114 can transmit the data gathered from environmental tracking modules 110*a-d*, including from the integrated RFID reader 312, and from the door tracking modules 110*e-f* to the remote server 108 via the messaging bus 116. In some embodiments, the controller module 114 is connected to a Top of Rack switch and adapted to automatically self-configure to identify its own location based on the switch configuration. The Top of Rack switch can be a management network switch, whose location is identifiable by parsing its switch name, which by policy, includes the grid location of the switch. Thus, the controller module 114 uses automation to self-identify its position without the need of any additional positional-sensing infrastructure. The controller module 114 can publish its location information to the remote server 108 via the messaging bus 116, along with the information collected from the various tracking modules 110*a-f*. The remote server 108 can use the location information of the controller module 114 to track the computing assets housed in the cabinet 104 by assigning the identifications of the computing assets (obtained from the RFID tags) to that location. In some embodiments, software updates by the controller module 114 can be triggered remotely and performed automatically.

In general, the underlying publish/subscribe data streaming architecture of the present invention is scalable both horizontally and vertically to handle increased data output from the data centers and/or increased data consumption from the subscribers. In some embodiments, the architecture is scalable horizontal to accommodate increased bandwidth requirements associated with (i) more rack cabinets 104 being added to the existing or new data centers and/or (ii) increased data publication output via the local monitoring networks 102. This publish/subscribe data streaming architecture can also accommodate an increased number of subscribers who want to consume the published data streams without disruption to the existing subscribers. This architecture allows new and disparate processes to plug into the data stream at-will and consume the published data for their purposes without disrupting existing processes already subscribed to the data stream. In some embodiments, as the data center management ecosystem 100 grows, processes are scaled up vertically to handle increased bandwidth demand by taking advantage of the distributed nature of the publish/subscribe data streaming architecture of the present invention. For example, as processes begin to be saturated, multiple subscribers can be grouped to process an assigned number of packets of data at a time without duplicating work and/or disrupting other processes/process groups. Further, due to the distributed nature of the publish/subscribe data streaming architecture, the centralized management of the ecosystem 100 can be divided across multiple remote servers 108 to increase efficiency, improve workload balance, lower response time and attain granular control on process scaling as the ecosystem 100 grows.

In another aspect, the data center management system 100 enables power usage monitoring and analysis using the existing data center infrastructure without installing additional monitoring hardware, such as power sensors. A data center typically has a number of power distribution units (PDUs) deployed at various locations in the data center to power the computing assets housed therein. For example, at least one PDU can be mounted on a rack cabinet 104 of the data center to distribute electrical power to the computing assets in the rack cabinet 104. Thus, the remote server 108 can be configured to automatically probe the PDUs to obtain power consumption data related to the rack cabinets 104.

Figure 5:
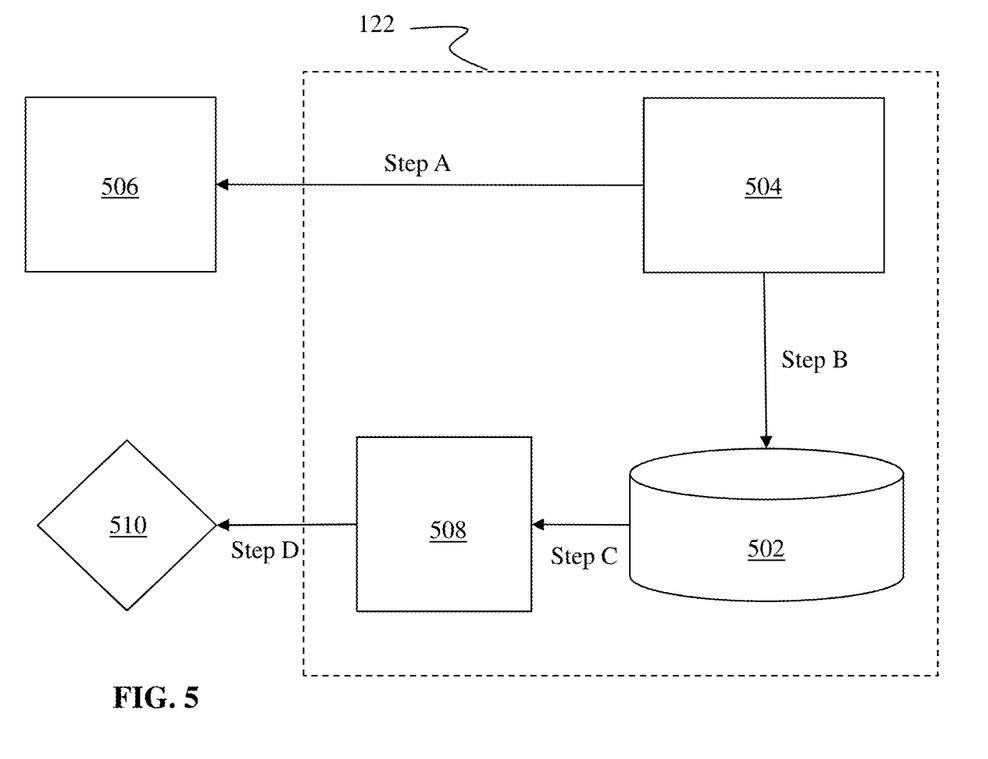
FIG. 5 shows an exemplary power tracking system of the remote server of the data management system of FIG. 1 configured to determine power consumption in a data center, according to some embodiments of the present invention.

FIG. 5 shows an exemplary configuration of the power analysis module 122 of the remote server 108 of the data management system of FIG. 1 configured to determine power consumption in one or more data centers, according to some embodiments of the present invention. As shown, the power analysis module 122 of the remote server 108 includes a PDU inventory database 502 configured to maintain a list of the PDUs in one or more data centers. For example, the PDU inventory database 502 can organize the list of PDUs by their unique identifications, such as hostnames. The power analysis module 122 includes a PDU inventory collector module 504 configured to automatically detect a new PDU after it is installed in the data center and supply the PDU's unique identification (e.g., hostname) to the PDU inventory database 502 for the purpose of tracking the newly installed PDU (step B). Specifically, the PDU inventory collector 504 can query an IP address management platform 506 to obtain hostnames that match a standardized PDU naming convention (step A). In general, the IP address management platform 506 is configured to store and manage hostnames and IP addresses of the hardware devices used in one or more data centers.

The power analysis module 122 also includes a probe module 508 configured to query the PDU inventory database 502 for the identifications (e.g., hostnames) of one or more PDUs (step C). The probe module 508 can then directly communicate with these PDUs 510 based on their identifications using, for example, a Simple Network Management Protocol (SNMP), to obtain their power consumption information (step D). In some embodiments, the probe module 508 communicates with all the PDUs 510 identified in the database 502 after it detects a change in the data center environment, such as the installation of a new PDU in the data center. Hence, the power analysis module 122 of the remote server 108 is able to automatically detect a new PDU installation and begin to track power usage immediately. In some embodiments, the remote server 108 can use the power consumption data collected by the power analysis module 122 to monitor power phasing across the PDUs in a data center and detect abnormalities, such as a power phase imbalance. In general, the power analysis module 122 of the remote server 108 is able to monitor data center power consumption using only the existing infrastructure, without any additional monitoring equipment and without interacting with the local monitoring networks 102 installed in the rack cabinets 104.

Referring again to FIG. 1, the dashboard module 118 of the remote server 108 is configured to display data and issue alerts related (i) the environmental data (collected from the various sensors) and the inventory data (collected from the RFID reader) of the local monitoring network 102 associated with each rack cabinet 104, (ii) sensor analytics calculated by the sensor analysis module 120 and (iii) power consumption data collected from the data center PDUs by the power analysis module 122. The dashboard module 118 can display the data in easy-to-read graphs, charts, reports or other formats in real time or near real time as the data is being collected. The display, including graphs and reports, is user configurable and customizable. For example, a user can scale the display to view data on a desirable time scale, such as last seconds, minutes, hours, months or years. A user can also choose to view data hierarchically in relation to the physical locations of the data centers, such as from the rack level, row level, data hall level, data center level or regional, national or worldwide level. Further, the dashboard module 118 can generate heat maps for temperature, power and other metrics at each of these levels. The dashboard module 118 can also predict trends to estimate future conditions based on historical data collected as well as automatically recommend resource reallocation based on the prediction.

Figure 6:
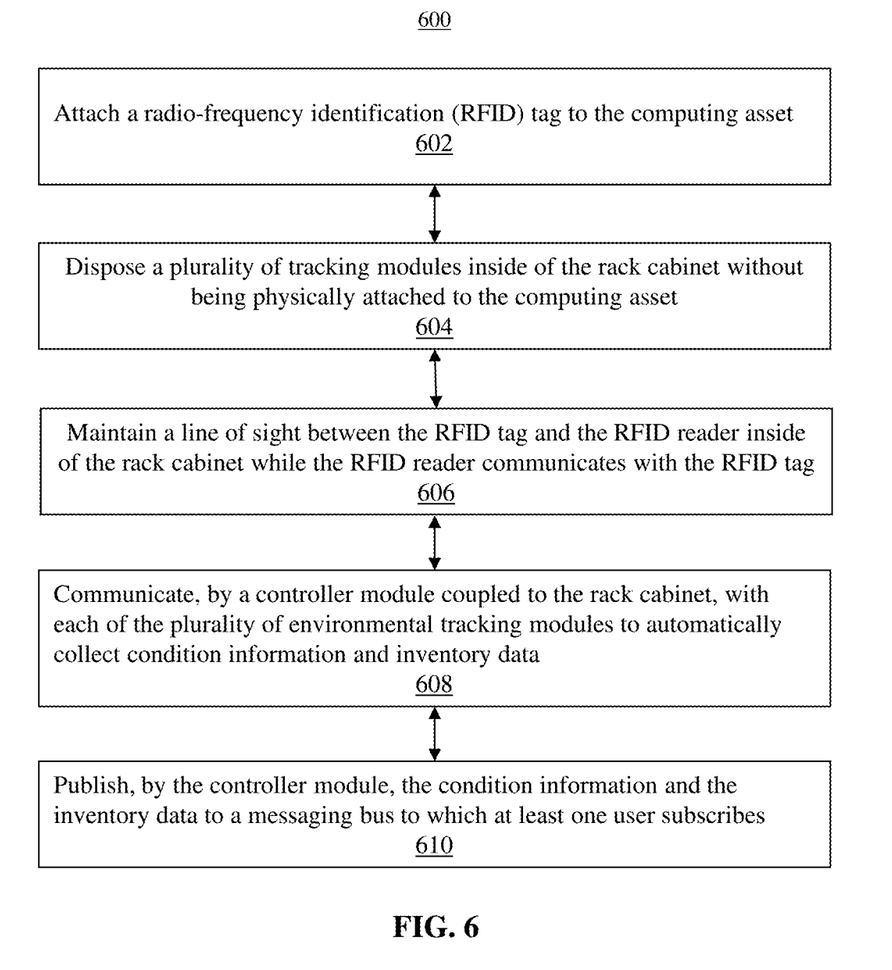
FIG. 6 shows an exemplary process for monitoring a data center using the management system of FIG. 1, accordingly to some embodiments of the present invention.

FIG. 6 shows an exemplary process 600 for monitoring one or more data centers using the management system 100 of FIG. 1, accordingly to some embodiments of the present invention. At step 602, an RFID tag (such as the tag 112 of FIG. 1) is attached to each computing asset stored in a rack cabinet 104 of a data center, where the computing asset represents equipment that an operator would like to track. The RFID tag stores inventory data, such as a serial number, corresponding to the computing asset. At step 604, multiple tracking modules, such as the environmental tracking modules 110a-d and the door tracking modules 110e and 110f of FIG. 1, are disposed inside of the rack cabinet 104 in an exemplary configuration as shown in FIG. 2. Each environmental tracking module includes a number of sensors used to monitor the environmental conditions inside of the cabinet 104, as shown in FIG. 3. Each door tracking module is configured to monitor the door open/closed status of the rack cabinet. An RFID reader, such as reader 312 of FIG. 3, is integrated with one of the tracking modules to communicate with the one or more RFID tags of the computing assets housed inside the same rack cabinet 104. At step 606, the tracking module with the integrated RFID reader is arranged inside of the rack cabinet 104 such that a line of sight is maintained between the RFID tags and the RFID reader to minimize metallic interference while allowing the RFID reader to interrogate the RFID tags to obtain the inventory data associated with the computing assets. At step 608, the multiple tracking modules are connected (e.g., via wired connections) to a controller module, such as the controller module 114 of FIG. 4, so that the environment data, door status data, and inventory data collected by the tracking modules are automatically transmitted to the controller module. At step 610, the controller module is adapted to publish the collected data to a messaging bus, such as the messaging bus 116 of FIG. 1, to which a remote subscriber, such as the remote server 118 of FIG. 1, subscribes. The remote server 118 can perform data analytics as described above using the collected data. In some embodiments, the remote server 118 interacts with various PDUs distributed in one or more data centers to obtain and analyze power consumption data as described above with reference to FIG. 5.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). The transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). The mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for monitoring a data center that includes at least one rack cabinet configured to store at least one computing asset, the system comprising:
    a radio-frequency identification (RFID) tag attached to the computing asset, the RFID tag storing inventory data related to the computing asset;
    a plurality of tracking modules disposed inside of the rack cabinet without being physically attached to the computing asset, each tracking module adapted to monitor a condition inside of the rack cabinet, wherein at least one of the plurality of tracking modules includes an RFID reader configured to communicate with the RFID tag to obtain the inventory data of the computing asset, and wherein the RFID tag and reader maintain a line of sight relative to each other inside of the rack cabinet to minimize metallic interference during communication therebetween; and
    a controller module coupled to the rack cabinet and in electrical communication with the plurality of environmental tracking modules, the controller module configured to automatically collect condition information and inventory data from the plurality of tracking modules, self-identify a location of the controller module, and publish the condition information, inventory data and location data to a messaging bus to which at least one subscriber subscribes.

2. The system of claim 1, wherein the subscriber is a remote server configured to analyze and display the condition information, the inventory data, and the location data published by the controller module.

3. The system of claim 2, wherein the plurality of tracking modules includes at least four environmental tracking modules configured to track one or more environmental conditions inside of the rack cabinet.

4. The system of claim 3, wherein each of the plurality of environmental tracking modules comprises one or more of a temperature sensor, a humidity sensor, a pressure sensor, a particulate sensor, and a vibration sensor.

5. The system of claim 4, wherein at least two of the environmental tracking modules are mounted on a back area of the rack cabinet with at least one environmental tracking module on a top portion of the rack cabinet and at least another environmental tracking module on a bottom portion of the rack cabinet, and at least two of the environmental tracking modules are mounted on a front area of the rack cabinet with at least one environmental tracking module on the top portion and at least another environmental tracking module on the bottom portion.

6. The system of claim 5, wherein the remote server is adapted to determine and display at least one of: (i) temperatures determined by the temperature sensors of the environmental tracking modules, (ii) a first temperature gradient between the front area and the back area of the rack cabinet, and (iii) a second temperature gradient between the top portion and the bottom portion of the rack cabinet.

7. The system of claim 6, wherein the remote server is adapted to issue an alert if at least one of the temperatures, the first temperature gradient, or the second temperature gradient is above or below a predefined threshold.

8. The system of claim 4, wherein the remote server is adapted to issue an alert if a humidity level inside of the rack cabinet is above or below a predetermined threshold based on measurements by the humidity sensor.

9. The system of claim 4, wherein the remote server is adapted to issue an alert if air flow contamination is detected based on measurements by the particulate sensor.

10. The system of claim 4, wherein the remote server is adapted to detect malfunctioning by the computing asset based on excess vibration detected by the vibration sensor.

11. The system of claim 2, wherein the plurality of tracking modules comprises at least two door tracking modules that are mounted on respective ones of a front door and a back door of the rack cabinet to detect an intrusion of the rack cabinet.

12. The system of claim 11, wherein the remote server is adapted to issue an intrusion alert if an intrusion of the rack cabinet is detected based on measurements by the door tracking modules.

13. The system of claim 2, wherein the remote server is configured to automatically obtain power consumption data from at least one power distribution unit (PDU) of the rack cabinet based on an IP address of the PDU and using a Simple Network Management Protocol (SNMP).

14. The system of claim 13, wherein the remote server is adapted to detect a power imbalance in the rack cabinet based on the power consumption data.

15. The system of claim 13, wherein the remote server visualizes data collected from the controller module and the PDU on an online dashboard that is configurable by a user.

16. The system of claim 1, wherein the RFID tag comprises a passive tag.

17. The system of claim 1, wherein the controller module maintains wired connection with the plurality of tracking modules.

18. A method for monitoring a data center that includes at least one rack cabinet configured to store at least one computing asset, the method comprising:
   attaching a radio-frequency identification (RFID) tag to the computing asset, the RFID tag storing inventory data related to the computing asset;
   disposing a plurality of tracking modules inside of the rack cabinet without being physically attached to the computing asset, each tracking module adapted to monitor a condition inside of the rack cabinet, wherein at least one of the plurality of tracking modules includes an RFID reader;
   maintaining a line of sight between the RFID tag and the RFID reader inside of the rack cabinet while the RFID reader communicates with the RFID tag to obtain the inventory data associated with the computing asset;
   communicating, by a controller module coupled to the rack cabinet, with each of the plurality of environmental tracking modules to automatically collect condition information and inventory data from the plurality of tracking modules; and
   publishing, by the controller module, the condition information and the inventory data to a messaging bus to which at least one user subscribes.

19. The method of claim 18, further comprising subscribing, by a remote server, to the messaging bus to obtain and analyze the condition information and the inventory data published by the controller module.

20. The method of claim 19, further comprising automatically obtaining, by the remote server, power consumption data from at least one power distribution unit (PDU) of the rack cabinet based on an IP address of the PDU and using a Simple Network Management Protocol (SNMP) communication protocol.

* * * * *